United States Patent
Cuervo et al.

(10) Patent No.: US 10,204,395 B2
(45) Date of Patent: Feb. 12, 2019

(54) STEREOSCOPIC VIRTUAL REALITY THROUGH CACHING AND IMAGE BASED RENDERING

(71) Applicant: Microsoft Technology Licensing, LLC, Redmond, WA (US)

(72) Inventors: Eduardo Cuervo, Bellevue, WA (US); Kevin Boos, Houston, TX (US); David Chu, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 132 days.

(21) Appl. No.: 15/298,158

(22) Filed: Oct. 19, 2016

(65) Prior Publication Data
US 2018/0108110 A1    Apr. 19, 2018

(51) Int. Cl.
| | |
|---|---|
| G06F 3/01 | (2006.01) |
| G06T 1/20 | (2006.01) |
| G06T 1/60 | (2006.01) |
| G06T 15/00 | (2011.01) |
| G06T 15/20 | (2011.01) |
| H04N 13/00 | (2018.01) |

(52) U.S. Cl.
CPC .............. *G06T 1/60* (2013.01); *G06F 3/012* (2013.01); *G06T 1/20* (2013.01); *G06T 15/005* (2013.01); *G06T 15/20* (2013.01); *H04N 13/00* (2013.01)

(58) Field of Classification Search
CPC .................................................. H04N 13/0048
See application file for complete search history.

(56) References Cited

U.S. PATENT DOCUMENTS

| | | | |
|---|---|---|---|
| 8,745,152 B2 | 6/2014 | Rapo | |
| 9,307,007 B2 | 4/2016 | Kapadia et al. | |
| 9,384,711 B2 | 7/2016 | Ergan et al. | |
| 2005/0226505 A1* | 10/2005 | Wilson | G06F 3/0425 382/180 |

(Continued)

OTHER PUBLICATIONS

Boos, et al., "Demo: FlashBack: Immersive Virtual Reality on Mobile Devices via Rendering Memoization", In Proceedings of the 14th ACM International Conference on Mobile Systems, Jun. 25, 2016, pp. 94.

(Continued)

*Primary Examiner* — Matthew Salvucci
(74) *Attorney, Agent, or Firm* — Fountainhead Law Group P.C.

(57) ABSTRACT

Virtual reality is provided by a mobile VR device. VR scenes are displayed by serving an application's image requests from a local cache of pre-rendered image frames. As the device user moves, image frames that match a VR scene viewed from a current pose (3D position and 3D orientation of the device translated to the virtual environment) are retrieved from the cache and displayed to the user as a VR scene. The cache may include a static cache including static image frames and a dynamic object cache including dynamic object image frames. The static cache may be indexed by the device current pose. The dynamic object cache may be indexed by the dynamic object's animation stage, orientation, and relative distance from the device user's current pose for a given time or movement-based trigger. Static image frames and dynamic object image frames may be composited, and displayed as a scene.

18 Claims, 9 Drawing Sheets

(56) References Cited

U.S. PATENT DOCUMENTS

| | | | |
|---|---|---|---|
| 2007/0035706 A1* | 2/2007 | Margulis | G03B 21/20 353/122 |
| 2010/0073379 A1 | 3/2010 | Berger et al. | |
| 2016/0217616 A1* | 7/2016 | Kraver | G06F 3/012 |
| 2017/0295356 A1* | 10/2017 | Abbas | H04N 13/0048 |

OTHER PUBLICATIONS

Boos, et al., "Flashback—Immersive Virtual Reality on Mobile Devices via Rendering Memoization", In Proceedings of the 14th ACM International Conference on Mobile Systems, Jun. 26, 2016, 44 pages.

Hassan, Mehedi, "Microsoft's FlashBack is capable of bringing high-quality VR to low-end phones", Published on: May 30, 2016 Available at: http://mspoweruser.com/microsofts-flashback-capable-bringing-high-quality-vr-low-end-phones/.

Li, et al., "Data Management for Visualizing Large Virtual Environments", In Proceedings of the International symposium on Multimedia Information Processing, Aug. 5, 2016, 6 pages.

"Microsoft's New Algorithm Allows Less Powerful Devices to Become VR-Compatible", Retrieved on: Aug. 8, 2016 Available at: http://vrtalk.com/forum/showthread.php?2519-Microsoft-s-New-Algorithm-Allows-Less-Powerful-Devices-to-Become-VR-Compatible.

Al-Obaidi, Zeena, "Microsoft's FlashBack Aims to Redefine Mobile VR", Published on: May 30, 2016 Available at: https://www.vrfocus.com/2016/05/microsofts-flashback-aims-to-redefine-mobile-vr/.

Carrozzino, et al., "Image Caching Algorithms and Strategies for Real Time Rendering of Complex Virtual Environments", In Proceedings of the 1st international conference on Computer graphics, virtual reality and visualisation, Nov. 5, 2011, pp. 65-73.

Trindade, et al., "Improving 3D Navigation in Multiscale Environments Using Cubemap-based Techniques", In Proceedings of the ACM Symposium on Applied Computing, Mar. 21, 2011, pp. 1215-1221.

Ardouin, et al., "Stereoscopic Rendering of Virtual Environments with Wide Field-of-Views up to 360?", In Proceedings of IEEE Virtual Reality, Mar. 29, 2014, 6 pages.

Abrash, Michael, "Latency—the sine qua non of AR and VR", Published on: Dec. 29, 2012 Available at: http://blogs.valvesoftware.com/abrash/latency-the-sine-qua-non-of-ar-and-vr/.

* cited by examiner

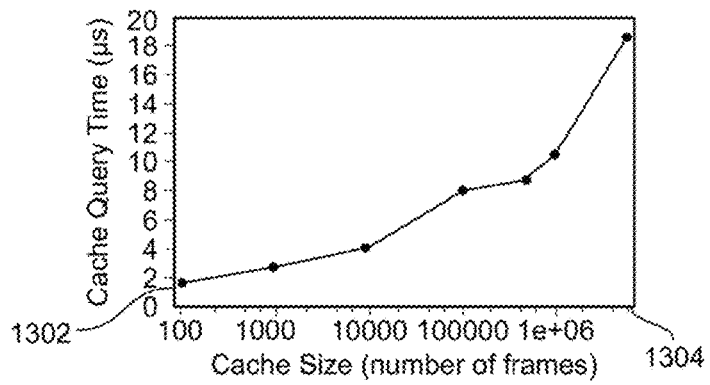
FIG. 13A
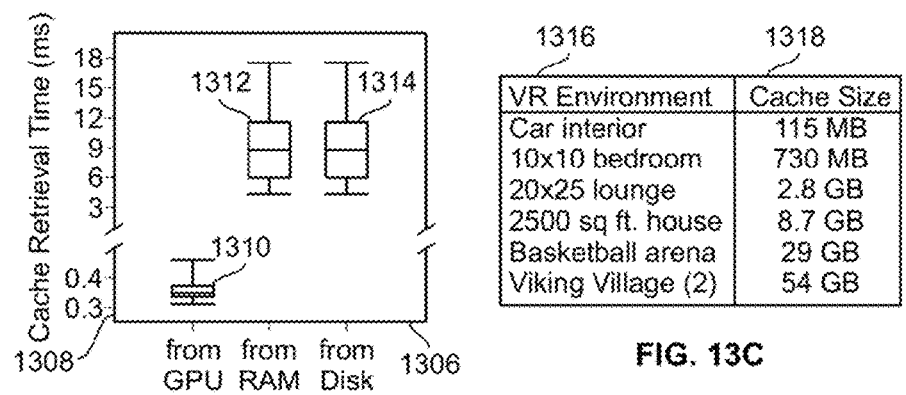
FIG. 13B
FIG. 13C
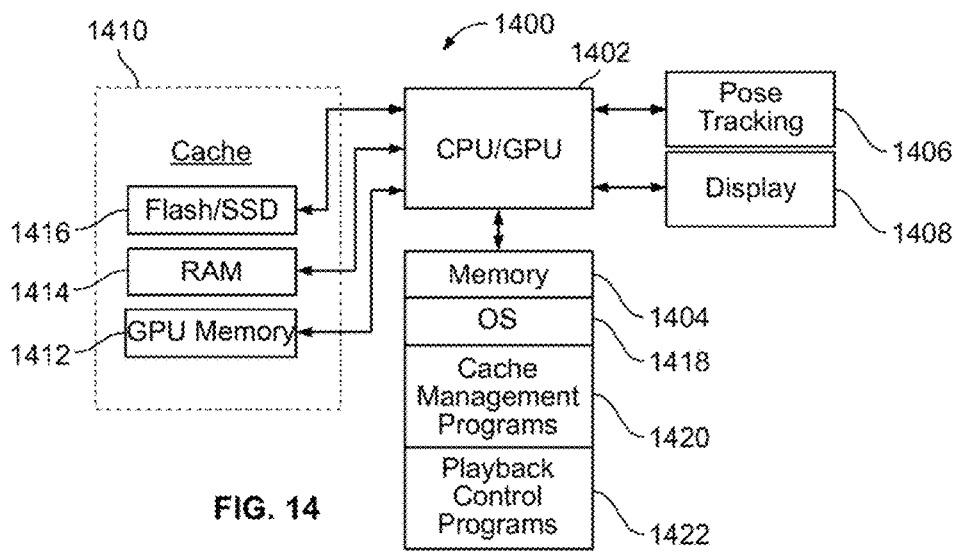
FIG. 14

STEREOSCOPIC VIRTUAL REALITY THROUGH CACHING AND IMAGE BASED RENDERING

BACKGROUND

Virtual reality head-mounted displays (VR HMDs) are attracting users by offering the potential of full sensory immersion in virtual environments. In order to create the illusion of fill immersion, a near-eye display of a VR HMD requires very heavy image processing and image rendering workloads. Low latency, high framerate, and high visual quality are all needed. Tethered virtual reality (VR) setups in which the head-mounted displays (HMD) is bound to a powerful gaming desktop provide limited mobility and exploration, and are difficult to deploy widely. Current untethered mobile products are intended to offer a user a realistic mobile VR experience, but their graphic processing units (GPUs) are too power-constrained to produce an acceptable framerate and latency, even for scenes of modest visual quality.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The disclosed embodiments include systems, apparatus and methods that provide a virtual reality (VR) experience on a VR device. The embodiments allow display of scenes in a VR environment by serving a VR application's high data rate image rendering requests from a local cache of pre-rendered high definition (HD) frames. Generating the local cache by utilizing a pre-rendering process minimizes resource demands for real-time rendering/processing in the VR device. In an example implementation, an N-layer cache may be implemented on the VR device for storage of image frames. For example, a three-tier image frame cache may be implemented in a layer 1 graphics processing unit (GPU) memory, such as video RAM (VRAM), a layer 2 system memory, such as RAM, and in a layer 3 secondary storage, such as Flash, SSD, or Disk, on the VR device to store the set of image frames needed for a given VR application. The VR device may include sensors that provide pose information comprising the 3D position and 3D orientation of the VR device. The cache may be indexed by the VR device's current pose that may be translated to virtual environment image frames to provide a view that matches a VR scene as viewed from the current pose. For example, the VR device may comprise a VR device such as a VR head mounted display (VR HMD) that a user wears to provide a virtual scene in the user's view as the user moves. As the VR device moves in the virtual environment and changes its pose, updated image frames are retrieved from the cache using a nearest-neighbor algorithm to quickly search the 3D space and display the updated image frames to the user as a VR scene.

In one example implementation, the image frames may be a series of static image frames that each display a static VR scene to the user and/or dynamic object frames that may support display of moving animated dynamic objects in the VR scene, such as a person walking, or one or more cars driving, in the virtual environment. In this implementation the cache may include a static cache including static image frames and a dynamic object cache. The static cache may be indexed by the VR device's pose. The dynamic objects may be provided by using a per-object dynamic cache data structure. Dynamic object caches, are indexed by the dynamic object's animation stage, orientation, and relative distance from the VR mobile device user's current pose (3D position and 3D orientation of the device translated to the virtual environment) for a given time or movement-based trigger. Unlike the static scene cache, a dynamic object cache stores frames that contain a view of the dynamic object only. This allows static frames to be combined with multiple dynamic frames using pixel depth metadata embedded in each frame to provide moving dynamic objects in a VR environment.

The indexing in the cache and the storage of the image frames in the layers of the cache may be optimized. For example, the indexing may be optimized based on tree searching, to allow quick return of image frames stored in the first layer GPU memory for immediate display, while concurrently fetching better image frames from the second layer system memory and third layer secondary storage in the storage hierarchy for future requests. In the example implementation, on a cache miss, fast approximations of the correct image based on mesh warping techniques may be utilized. Also, cache compression techniques may be utilized to fit more image frame entries in the second and third layers of the cache storage. Cache compression techniques may also be utilized to increase throughput when image frames are retrieved from and moved between the different cache layers. For example, image frames in the second and third cache layers that are used less often by a VR application may be compressed while image frames in the first cache layer that are used more often by the VR applications may be uncompressed.

The embodiments include an apparatus for generating the image frame cache that is utilized on the VR device according to the embodiments. The apparatus for generating the cache may be an apparatus separate from the VR device on which the cache is utilized. In this case the generated cache may be downloaded to the mobile VR device. Alternately, the apparatus for generating the cache may be implemented as part of the mobile VR device itself.

BRIEF DESCRIPTION OF THE DRAWINGS

FIGS. 13A, 13B, and 13C illustrate example cache parameters for use in various example implementations; and, FIG. 14 is a simplified block diagram of an example device.

DETAILED DESCRIPTION

Figure 1:
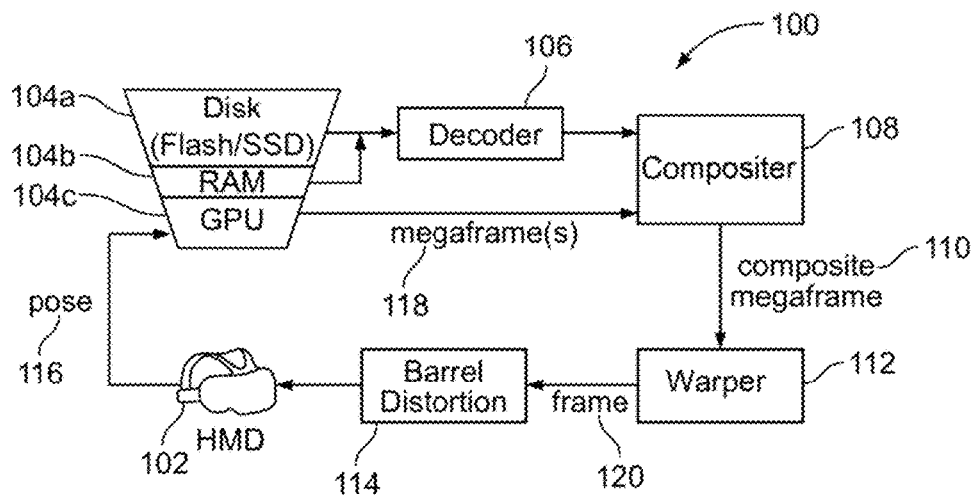
FIG. 1 is a simplified diagram illustrating operational flow of functions according to an implementation.

The system, devices, and methods will now be described by use of example, embodiments. The example embodiments are presented in this disclosure for illustrative purposes, and not intended to be restrictive or limiting on the scope of the disclosure or the claims presented herein.

The disclosed embodiments provide a full-quality virtual reality (VR) experience on a VR device. The embodiments provide a virtual reality experience by serving VR device's application's high data rate image rendering requests from a local cache of pre rendered high definition (HD) frames stored on the VR device. Use of the local cache effectively memorizes prior rendering efforts performed for the VR application. Generating the cache by pre-rendering avoids the resource demands of real-time rendering/processing on a mobile graphic processing unit (GPU). This leverages the prevailing trend of low-power storage that is increasingly abundant, cheap, and often underutilized, while graphical rendering/processing remains restricted due to thermal and energy constraints. In implementations, the storage available for the caching may be sufficient to fully cache entire VR scenes. The cache may be generated on the VR device, or may be generated in a remote server, or on a desktop. The embodiments overcome limitations of both tethered and other types of devices that render VR scenes in real time. The indexing and the storage of the image frames in the layers of the cache may be optimized. For example, the indexing may be optimized based on tree searching, to allow quick return of image frames stored in first layer GPU memory for immediate display while concurrently fetching better image frames from second layer system memory and third layer secondary storage cache layers in the storage hierarchy for future requests. In the example implementation, on a cache miss, fast approximations of the correct image based on mesh warping techniques may be utilized. Also, cache compression techniques may be utilized to fit more image frame entries in the second layer system memory and third layer secondary storage. Cache compression techniques may also be utilized to increase throughput when image frames are retrieved from and moved between the different cache layers. For example, image frames in the second layer system memory and third layer secondary storage cache layers that are used less often by a VR application may be compressed while image frames in the first layer GPU memory that are used more often by the VR applications may be uncompressed.

Instead of running any application on the VR device itself to populate the cache, the pre-rendered results for an application may be downloaded to the cache on the VR mobile device for future use during playback, similar to downloading a movie. In another implementation, for example when enough processing time is available, the cache may be pre-rendered on the VR mobile device itself. In another example implementation, animated dynamic objects, such as a person walking, or one or more cars driving may be displayed in the VR environment. The dynamic objects may be provided by using a per-object cache data structure. Dynamic object caches are indexed by the dynamic object's animation stage, orientation, and relative distance from the VR device's pose for a given time or movement-based trigger. Unlike the static scene cache, a dynamic object cache stores frames that contain a view of the dynamic object only. This allows static frames to be combined with multiple dynamic frames using pixel depth metadata embedded in each frame to provide moving dynamic objects in a VR environment. The VR experience provided may the embodiments is highly non-linear and interactive.

The embodiments provide technical advantages over currently used VR devices, For example, wearable VR HMDs fall into two general device classes: (i) Tethered HMDs that are HMDs tethered to powerful, expensive desktops, and (ii) Mobile-rendered HMDs that are self-contained untethered HMDs that run on mobile phones slotted into head mounts. Both device classes have significant drawbacks. Tethered HMDs may be capable of rendering graphical scenes at high framerates and high visual quality, but require significant GPU and computing resources in the form of a dedicated gaming desktop or a console co-located with the user. Tethered HMDs limit mobility and come with a high cost barrier. Tethered HMDs also have a drawback in that there is a risk of the tethered cords wrapping around a user's neck or other objects. Mobile-rendered HMDs are widely available but have the drawback that they provide low graphical quality, have poor battery life, and may heat up. All of these drawbacks break the illusion of virtual reality immersion, Also, mobile rendered HMD GPUs is may consume up to 20 W of peak power, making heat output a safety concern for near-eye devices without active cooling. Limiting mobile rendered HMD GPU power (and thus, performance) is highly undesirable because mobile GPUs are already over an order of magnitude slower than desktop GPUs. Also, limiting mobile GPU power may cause performance degradations in a near-eye display of a mobile rendered HMD, which may cause motion discomfort or simulator sickness.

Generating the cache of the embodiments by use of pre-rendering avoids the resource demands of real-time rendering/processing on a mobile graphic processing unit (GPU) while rendering virtual reality scenes. The use of the caching also allows a VR device to be low power, mobile, and unencumbered by tethering. This leverages the prevailing trend of low-power storage that is increasingly abundant, cheap, and often underutilized, while graphical rendering/processing remains restricted due to thermal and energy constraints.

Additionally, the embodiments provide technical advantages in allowing low cost/low weight devices to be used in many types of VR applications. Tethered HMD s are clearly cost-prohibitive, and even mobile-rendered HMDs require use with high-end phones with high-end GPUs. A VR mobile device implemented according to the embodiments may be light weight and cost effective. Use of the embodiments will allow immersive VR experiences on widely available, affordable devices for exciting new use cases. These new use cases may include virtual field trips, remote classroom instruction, enhanced training simulation, medical education and examination, therapeutic rehabilitation, etc.

FIG. 1 is a simplified diagram illustrating operational flow of functions according to an implementation. In operation, VR head mounted device (HMD) 102 may generate a current pose 116 of HMD 102. The current pose 116 comprises a position of HMD 102 and a view orientation of a device user (wearer) generated by sensors configured in HMD 102. The position is the location of the player in 3D world space and the view orientation is a rotation vector that represents where the player is looking. The current pose 116 is then used to look up and read multiple cache entries from cache 104 comprising megaframes that are used to render the user's view of a virtual scene. The cache 104 includes first layer GPU memory 104a, second layer system memory (RAM) 104b, and third layer secondary storage (disk/flash/SSD) 104c and may be implemented in the HMD 102. The first layer GPU memory 104a, second layer system memory (RAM) 104b, and third layer secondary storage (disk/flash/SSD) 104c, may be accessed with varying levels of access speed. The lookup is optimized by the cache indexing and cache compression configuration of cache 104. When required, entries are moved from higher to lower levels of the cache hierarchy to replace older cache entries. The cache entries may comprise both static megaframes and dynamic object megaframes. The cache entries that are retrieved from first layer GPU memory 104a, comprise uncompressed megaframes 118 that are provided to combiner 108. The cache entries that are retrieved from second layer system memory (RA) 104b, and third layer secondary storage (disk/flash/SSD) 104c comprise compressed megaframes that are provided to decoder 106 and decoded into uncompressed megaframes. The static and dynamic object megaframes are then composited into a final view by combiner 108 to generate a composite megaframe 110. Upon a cache miss, instead of rendering the correct view in real time, an approximation of the correct view is synthesized from available cache entries using mesh warping in cube warp function 112. The warping performed by cube warp function 112 may be performed at a speed that is two orders of magnitude faster than the time it takes to render the correct view in real time. The warping speed is not dependent on scene complexity, but is a fixed function of the screen resolution and runs efficiently even on mobile CPUs. The virtual reality scene may have arbitrarily complex visual detail and effects but the warping speed remains constant. Lens-offsetting barrel distortion may then be performed on megaframe 120 using a barrel distortion function 114. The final frame may then be displayed on a screen of HMD 102.

Figure 2:
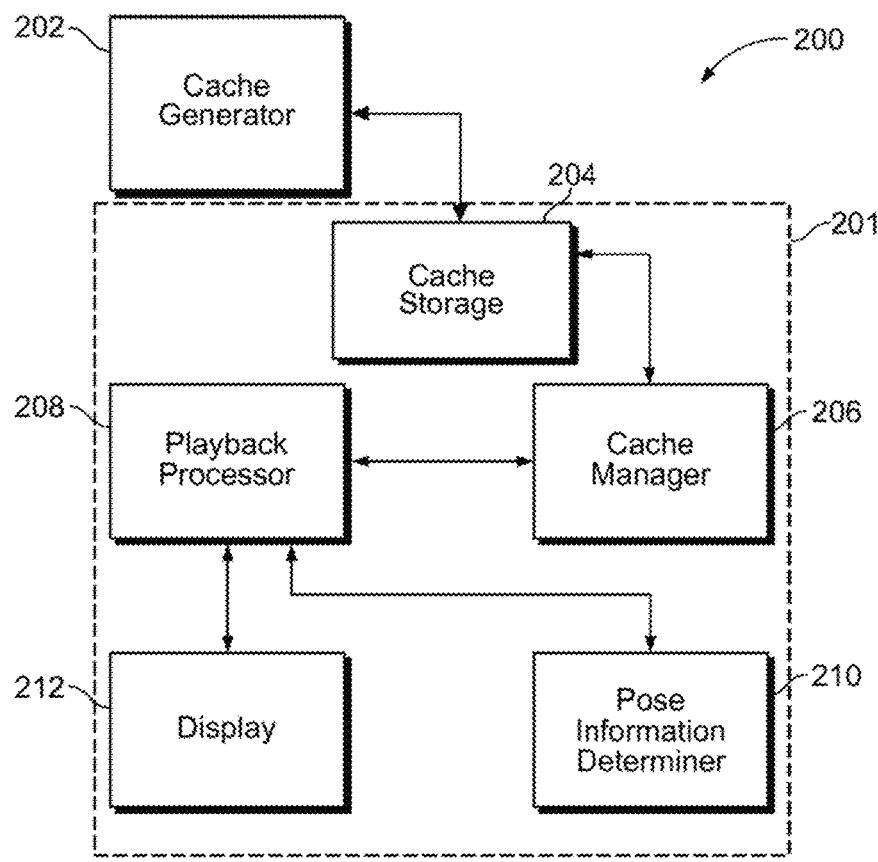
FIG. 2 is a simplified block diagram illustrating a system that may perform the functions of FIG. 1.

FIG. 2 is a simplified block diagram illustrating a system 200 that may perform the functions of FIG. 1. System 200 includes cache generator 202 and mobile device 201. Mobile device 201 includes cache storage. 204, cache manager 206, playback processor 208, pose information determiner 210, and display 212. Cache generator 202 may be implemented on a server that is located remotely from mobile device 201. Cache generator 202 may also be implemented on a PC computer that is tethered to the mobile device 201. Alternately, cache generator 202 may be implemented as part of the mobile device 201 itself, provided enough processing time is available for cache generator 202 to generate the cache for desired device usage.

Figure 3:
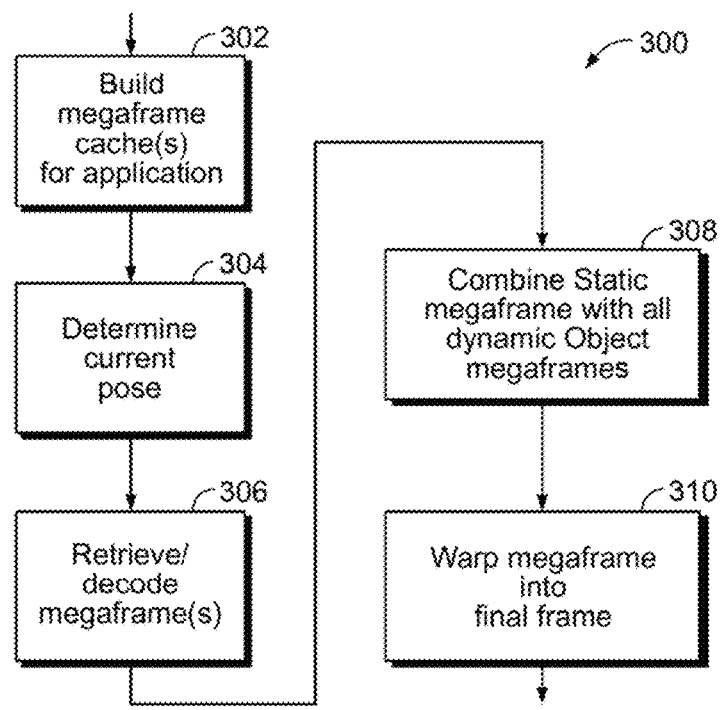
FIG. 3 is a simplified flow diagram illustrating example operations performed by the system of FIG. 2.

FIG. 3 is a simplified flow diagram illustrating example operations performed by the system of FIG. 2. At 302, cache generator 202 builds the megaframe caches for an application. Cache generator 202 performs cache generation by utilizing an array of virtual rendering cameras that automatically generate megaframes for a virtual reality environment/application. In the cache generation, a series of scripts is executed to coordinate the rendering camera behavior with automated device pose enumeration, which can be either manually bounded or automatically inferred based on the collision boxes and environment geometry of the virtual reality environment/application. Every megaframe of the virtual environment is encoded and saved to cache storage 204.

At 304 the current pose is determined by pose information determiner 210. Playback processor 208 reads pose information from the pose information determiner 210 and provides the pose information to Cache Manager 206. At 206, cache manager 206 retrieves and decodes (if necessary) the megaframes associated with the pose information. At 308, cache manager 206 combines static megaframes and dynamic megaframe (if both types of megaframes exist in the retrieved megaframes). Next at 310, cache manager warps the composite megaframe into a final megaframe. Cache Manager 206 then provides raw megaframes for playback on display 212.

Cache Manager 206 is responsible for parsing the cache contents from cache storage 204. Because the caches can scale to very large proportions, parsing them must be efficient at any scale. Iterating through every cached file is prohibitively slow, so cache manager 206 is configured to create a special index file for each cache instance once the cache is fully generated. This enables the cache manager 206 to bypass the parsing process altogether. Instead, for example, for static cache instances it memory maps or reads each index file directly into a pre-allocated R-tree instance, using an initial packing algorithm to create the whole R-tree in one batch, offering better query performance as a side benefit. The cache population procedure effectively flattens a VR application's complex behavior into a collection of data structures on storage.

In implementations, the playback functions of FIG. 2 may be wholly application agnostic and configured to play any memorized VR application without modification or recompilation. To switch between different VR applications, a device user redirects the playback functions program to a different set of cache data structures.

Figure 4:
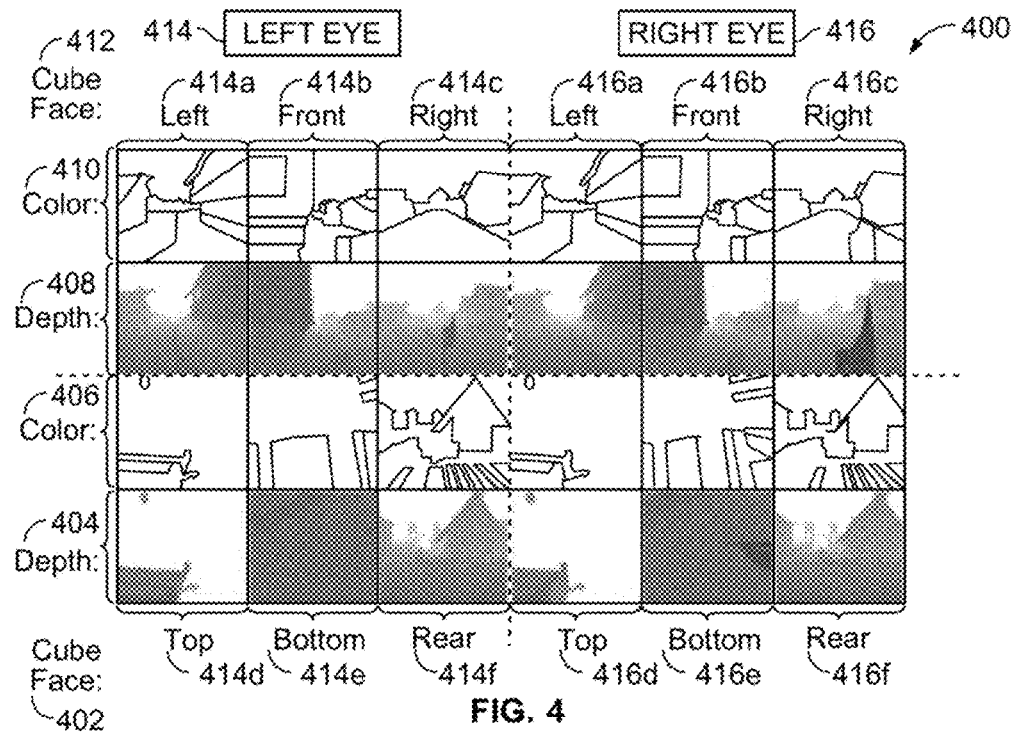
FIG. 4 is a diagram illustrating an example image megaframe.

FIG. 4 is a diagram illustrating an example image megaframe. Each entry of the cache storage 204 may consist of a high resolution megaframe as shown in FIG. 4. Each megaframe may be defined with respect to a pose, $p=((x, y, z), (\theta, \varphi, \psi))$. For example, the parameters $(x, y, z)$ may represent the position of mobile device 201 in 3D world coordinates, while, the parameters $(\theta, \varphi, \psi)$ may represent the view orientation (sometimes referred to as rotation) as an Euler angle comprising yaw, pitch, and roll respectively, of mobile device 201. With appropriate warping the megaframe allows reconstruction of nearby views that are translated or rotated with respect to the megaframe's pose. Internally, a megaframe is composed of four cube maps each being a 360° representation of an environment. The cube map draws a panoramic image on the six sides of a cube, with the center point of the cube being the current pose. With four cube maps and six faces per cube, the megaframe consists of 24 faces, as illustrated in the megaframe layout of FIG. 4.

The four cube maps in a single megaframe include; left eye color (RGB) cube map, left eye depth cube map, right eye color (RGB) cube map, and right eye depth cube map. For example, in FIG. 4, the left eye color (RGB) cube map comprises the 3 faces in each of the color rows 410 and 406, (6 total faces) that are in the left eye half 414 (left half) of FIG. 4, and the left eye depth cube map comprises the three faces in each of the depth rows 408 and 404 (6 total faces)

that are in the left eye half 414 (left half) of FIG. 4. The right eye color (RGB) cube map comprises the 3 faces in each of the color rows 410 and 406 (6 total face) that are in the right eye half 416 (right half) of FIG. 4 and the right eye depth cube map comprises the three faces in each of the depth rows 408 and 404 (6 total faces) that are in the right eye half 416 (right half) of FIG. 4). Each face of the cube represents a view perspective. For example, in FIG. 4, the 3 faces in the color row 410 of the left eye RGB cube comprise left, front, and right views shown in the left 414a, front 414b, and right 414c, columns, respectively. The 3 faces in the color row 406 of the left eye RGB cube comprise top, bottom, and rear views shown in the top 414d, bottom 414d, and rear 414d, columns, respectively. The 3 faces in the color row 410 of the right eye RGB cube comprise left, front, and right views shown in the left 416a, front 416b, and right 416c, columns, respectively. The 3 faces in the color row 406 of the right eye RGB cube comprise top, bottom, and rear views shown in the top 416d, bottom 416e, and rear 416f, columns, respectively. The 3 faces in the depth row 408 of the left eye RGB cube comprise left, front, and right views shown in the left 414a, front 414b, and right 414c, columns, respectively. The 3 faces in the depth row 404 of the left eye RGB cube comprise top, bottom, and rear views shown in top 414d, bottom 414e, and rear 414f columns, respectively. The 3 faces in the depth row 408 of the right eye RGB cube comprise left, front, and right views shown in the left 416a, front 416b, and right 416c, columns, respectively. The 3 faces in the depth row 404 of the right eye RGB cube comprise top, bottom, and rear views shown in the top 416d, bottom 416e, and rear 416f, columns, respectively.

The left and right eye cube maps 414 and 416 exist separately in order to generate a proper stereo view. Their positions are each offset from the megaframe's pose by a parameter defined as half the inter-pupillary distance (IPD), which may be a user-specific or averaged anatomical property that represents the distance between human eyes. The depth cube maps are not necessary for representing the RGB pixel content of the scene, but are useful during the warping step. All four cube maps in every megaframe are stored consistently at a fixed canonical orientation looking straight ahead, i.e. (θ, φ, ψ)=(0, 0, 0).

In other implementations, the cube map may be configured in any other appropriate way. For example, the cube map may be laid out for only one eye (left or right) and the other eye may be represented by using image based rendering (IBR). The cube map may also be laid out for one eye (left or right) with an additional view of the cube map from another perspective to prevent disocclusions. Other combinations of views are also possible. For example, the cub map maybe laid out with left and right eye views used in combination with an additional view. In further implementations, any type of projection that may be used in mesh warping may be used in place of the cube map. For example, non-linear representation may be used to better distribute resolution. Also, the depth information may be encoded in a separate megaframe from the color information megaframe. For example, the depth may be encoded using a different compression scheme (better suited to encode depth) in a separate megaframe and two cube maps may be used in parallel.

Additionally, in other implementations, the color space of the cube map may be encoded in any other appropriate color space, for example, YUV. Also, high dynamic range (HDR) images may be encoded in a scRGB color space (described in International Electrotechnical Commission (IEC) standard 61966-2-2), or in an xvYCC color space (described in IEC standard 61966-2-4).

Figure 5A:
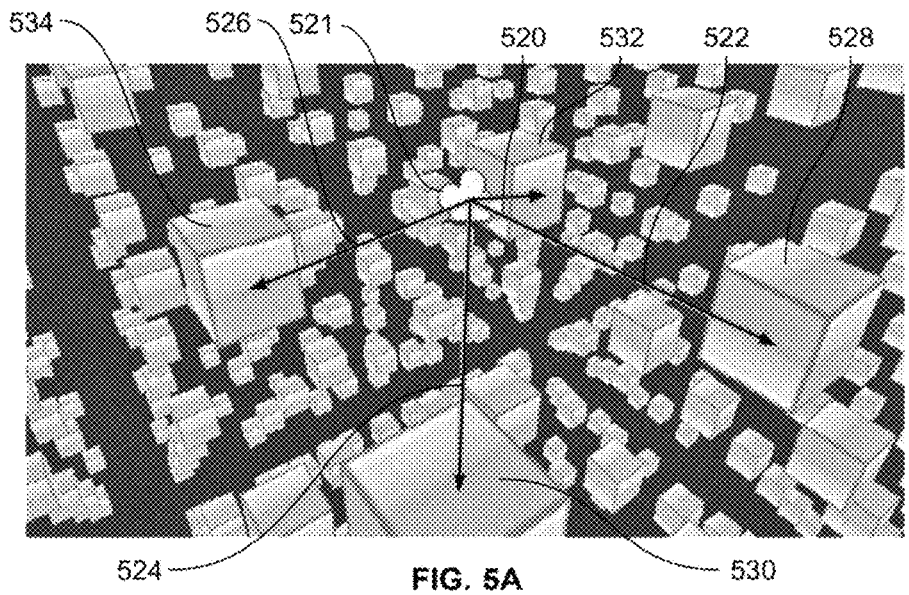
FIG. 5A provides an example visualization of how a static cache in cache storage may be laid out in logical 3D space.

FIG. 5A provides an example visualization of how the static cache in cache storage 204 may be laid out in logical 3D space. The megaframes conceptually occupy the 3D point matching the pose at which they were rendered. As mobile device 501 moves throughout the environment, it becomes closer to certain cubes and further from others Distance is defined with respect to the position difference in Euclidean space shown by coordinate axis 526, 520, 522, and 524. It is not necessary to consider orientation differences since megaframe cube maps are panoramic. Cube maps inherently contain all possible orientations for a given position. In terms of physical layout in memory or on storage, cache generator 202 builds a three-tier cache of megaframes. This is shown in FIG. 1 as an inverted triangle consisting of layer 1 GPU memory, layer 2 system RAM memory 104b, and layer 3 secondary storage (Disk, Flash\SSD 104a. Layer 1 GPU memory 104c may comprise GPU VRAM. Although the size of each tier in FIG. 1 is not to scale, layer 1 GPU memory 104 is the smallest, followed by a larger-sized layer 2 system memory (RAM) 104b, and finally substantially larger layer 3 secondary storage (Disk, Flash\SSD) 104a. Current mobile systems on a chip (SoCs) have GPU VRAMs statically allocated from system memory that are typically a few hundred MBs on integrated chips. System RAM is usually 0.5-2 GB (excluding GPU VRAM carve out). Secondary storage sizes of Fash can be up to several hundred GBs. SSDs, a composition of multiple flash chips, can be thousands of GBs. As such, a moderate number of megaframes may be stored on the GPU memory 104c, while all other megaframes are stored on the other two layers.

The cache is populated by generating frames, either on the mobile device itself (given enough time), or, alternatively downloaded much like a video file from a desktop computer or powerful rendering server in the cloud. Deploying a dataset as large as the megaframe cache from a cloud server to the mobile device is possible due to the cache's extremely high compressibility. The cache can be greatly compressed on the server due to adjacent megaframes having largely identical blocks, and then decompressed/decoded on the mobile device in an ahead-of-time cache unpacking step.

Figure 5B:
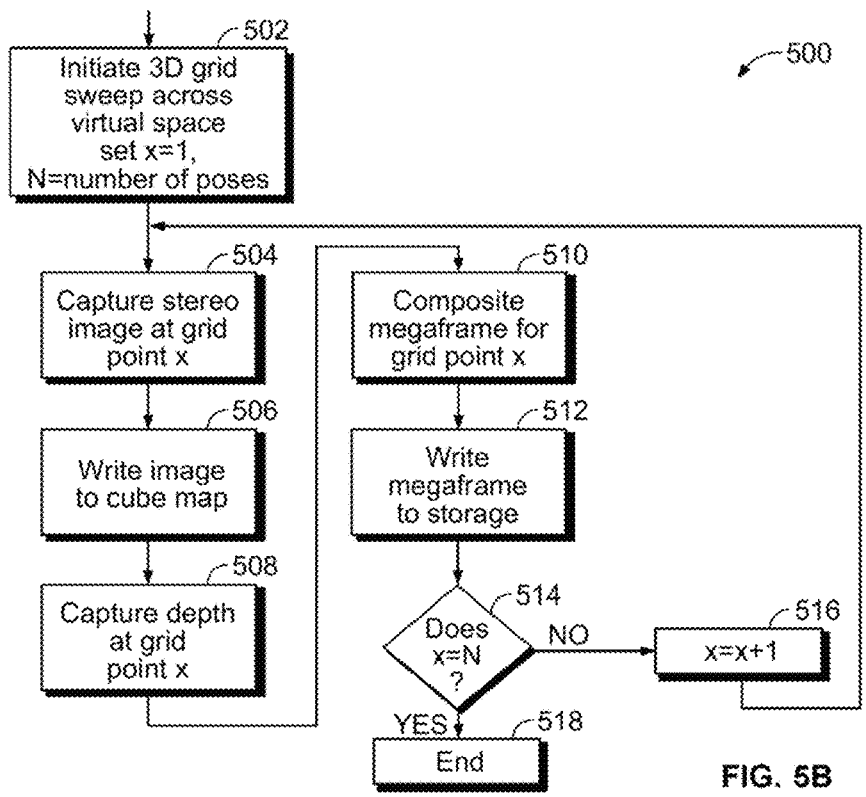
FIG. 5B is a flow diagram illustrating example operations for generating a static cache.

FIG. 5B is a flow diagram illustrating example operations for generating a static cache. The process of FIG. 5B may be used, for example, as part of operation 302 of FIG. 3. The process begins at 502 where cache generator 202 initiates a 3D grid sweep across the virtual space constituting the static scene. An index x is set to 1 and a parameter N is set to the number of poses. At 504, for grid point x in the virtual space, a panoramic stereo image of the virtual world is captured and, at 506, written to a cube map. At 508, cache generator 202 captures the depth for grid point x. Then at 510 cache generator 202 composites the corresponding megaframe for grid point x. The megaframe may be encoded as an individual key frame (I-frame) using a H.264 codec. In other implementations, any other type of appropriate codec may be used to encode the megaframe For example, the megaframe may also be encoded using an H.265 or custom codec. At 512, cache generator 202 then writes the encoded megaframe to secondary storage with a unique identifier linking the encoded megaframe back to the pose for which it was generated. At 514, it is determined if the index x is equal to N. If x is not equal to N, the procedure is repeated until every designated pose in the environment has been processed and it is determined at 514 that x=N. There are potentially $n^3$ combinations due to the three dimensions of the pose's position value. The density of the grid, or quantization, impacts both the final cache size and the visual artifacts encountered during the warping approximation, as well as latency and framerate. In an implementation, a virtual grid density between 0.02 and 0.05 virtual-world units may be used to provide a trade-off between unnoticeable visual artifacts and cache size, Additionally, the set of possible pose values may be reduced based on the geometry and restricted movement paths of the virtual environment. For example, for a virtual environment in which the player walks on the ground, the potential height values may be limited to a smaller range, e.g., five to seven feet above the ground. This technique may significantly reduce the pose state space by eliminating impossible values, such as poses that would be underground or inside of a solid wall in the virtual environment. Thus, while the worst case complexity of generating the megaframe cache is $O(n^3)$, the typical case is much less.

An embedded assumption in the operation of cache manager 206 is that every possible rendering request can be served by cached contents in one of the cache layers. However, the stable storage is finite and, therefore, in order to handle cache misses, nearby cached entries may be used to approximate the desired result. Use of this technique allows the effective cache hit ratio to be substantially increased. However, simply substituting a view centered at a pose p in lieu of a desired view at pose p' may result in a poor visual experience providing uncomfortable visual stuttering and disocclusions. Therefore, a mesh warp may be applied to the megaframe at p in order to derive an appropriate view for p'. Mesh warping is a type of Image-Based Rendering (IBR). Given an RGB cube map and matching depth cube map both at pose p (say, of the left eye), we can generate a novel view v' as if it had been taken from a new pose p'. Each pixel of the original view is mapped to a 3D position (since p and the depth map are known), and then the 3D position is re-projected to a pixel in the new view (since p' is known). The final view v' resolution may be proportional to the size of the megaframe. Assuming a typical mobile device (such as a HMD) field of view as 106° height, 94° width, a 4 k megaframe (3840-*2160) generates 720p final view frames (1280-*720). In certain situations, if the translation is too great (i.e., the position off and the position of p' are too far apart) then will suffer from visual artifacts such as disocclusions. For example, when posed looking at an open doorway and then stepping forward; from the original view, it is unclear what should appear in the disoccluded "holes" that are now visible. In this case, additional cube maps may be used to handle translations that are beyond a threshold, as is provided by the additional megaframes. Conversely, since the cube map covers a panoramic view, mesh warping is robust to arbitrary changes in rotation without introducing artifacts.

Figure 6:
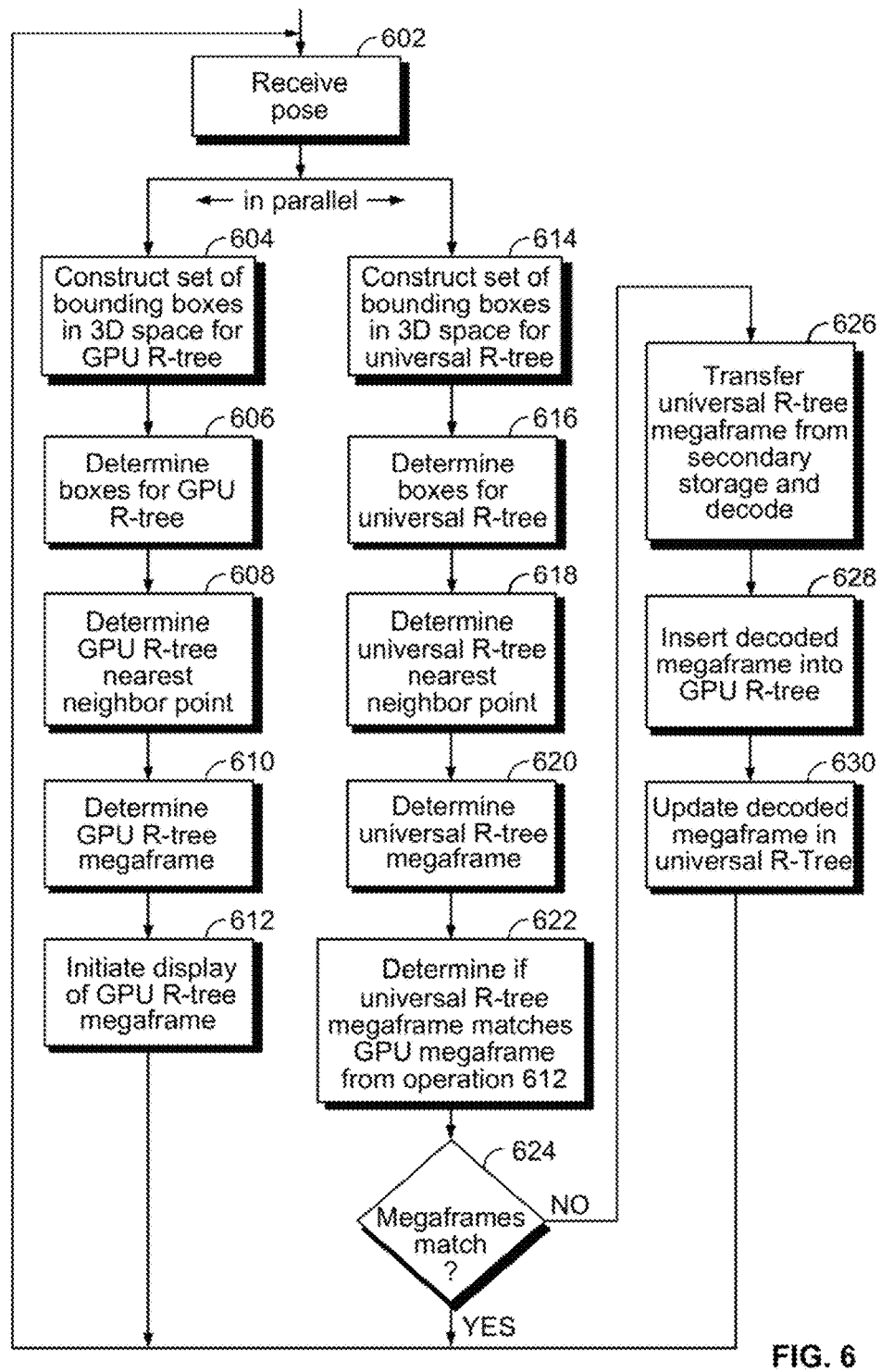
FIG. 6 is a flow diagram illustrating operations for retrieving an image frame from a static cache.

FIG. 6 is a flow diagram illustrating operations for determining/retrieving an image frame from a static cache. The process of FIG. 6 may be used, for example, as part of operation 306 of FIG. 3. In an implementation, R-trees may be used to provide fast lookup, allows queries across storage hierarchies, and provides support for cache insertions and deletions. The R-trees may be implemented in such a way that whenever a new pose request is received, a megaframe result may be immediately returned from the layer 1 GPU memory in cache for display. At substantially the same time, if there is an even closer megaframe that exists in either Layer 2 or Layer 3 cache, it is fetched asynchronously to the Layer 1 mega: frame such that it is available to service future pose requests, taking advantage of temporal locality. As such, the notion of a cache miss refers to the requested megaframe not having an identical match in the layer 1 GPU cache, in the embodiment, to support the retrieval of megaframes at substantially the same time from both of Layer 1 and Layer 2 or Layer 3, a dual R-tree data structure is implemented. Specifically, two distinct R-trees are maintained. These may be implemented as a GPU R-tree and a universal R-tree. The GPU R-tree only indexes cache entries that are currently resident in the layer 1 GPU memory cache, whereas the universal R-tree indexes all cache entries across all three storage levels, Layer 11, Layer 2, and Layer 3.

At 602, cache manager 206 may receive a request in the form of a Cache Key (CK) structure comprising a pose, and return a Cache Value (CV) structure containing a reference to a retrieved megaframe, while decoding the megaframe if necessary. The coordinate axis 526, 520, 522, and 524 in FIG. 5A show the Euclidean distance vectors used to locate the closest matching megaframe cube for a given requested CK pose. At 604, cache manager 206 initiates a nearest-neighbor search using the GPU R-tree by constructing a set of minimally overlapping bounding boxes that each includes subsets of points (the megaframe positions) in the 3D space. In parallel, at 614, cache manager 206 also initiates a nearest-neighbor search using the universal R-tree by constructing a set of minimally overlapping bounding boxes that each includes subsets of points (the megaframe positions) in the 3D space. The use of the bounding boxes eliminates large portions of the search space.

Next, at 604, cache manager 206 locates the, correct bounding box for the GPU R-tree. Similarly, in parallel at 616, cache manager 206 determines the correct bounding box for the universal R-tree. At 608, cache manager 206 determines the distance from each existing point to the target point (the desired pose's position) and selects the GPU R-tree closest neighbor point. Similarly, in parallel at 618, cache manager 206 determines the distance from each existing point to the target point (the desired pose's position) and selects the universal tree closest neighbor point. Next, at 610, cache manager 206 determines the nearest neighbor GPU R-tree, megaframe from the GPU R-tree closet neighbor point. Similarly, in parallel at 620, cache manager 206 determines the universal nearest neighbor R-tree megaframe from the universal R-tree closet neighbor point.

At 612, cache manager 206 provides the nearest neighbor GPU R-tree megaframe determined in 610 to playback processor 208 for immediate display on display 212. Also in parallel, at 622, cache manager 206 determines if the universal R-tree megaframe determined from the universal R-tree at 620 matches the GPU R-tree megaframe determined from the GPU R-tree at 610. At 624, if the two megaframes match, no further action is taken and the process returns to 602 where cache manager 206 receives the next pose. If the two megaframes do not match, at 624 the process moves to 626. At 626, the universal R-tree megaframe is retrieved from secondary storage, if it was found on Layer 3, or retrieved from system RAM, if it was found on Layer 2 and the universal R-tree mega frame is then asynchronously decoded to Layer 1. At 628, the universal. R-tree megaframe is inserted into the layer 1 GPU R-tree and, at 630, updated in the universal R-tree.

The CV structure must be kept to a minimal size because there are potentially millions of instances, one for every cached megaframe. A CV holds a pointer to either a file location on layer 3 storage, byte array on layer 2 system memory, or raw texture on layer 1 GPU memory, depending on which cache level a megaframe resides. In the implementations, a CV can exist in multiple cache levels simultaneously. This provides redundancy if the CV must be evicted from Layer tor Layer 2 cache to relieve memory pressure. Because the cache contents are read-only, there is no need to write back cache entries into stable storage. Also, cache eviction is, simply a matter of removing a cache entry from the index, which is a fast operation for R-trees.

Figure 7A:
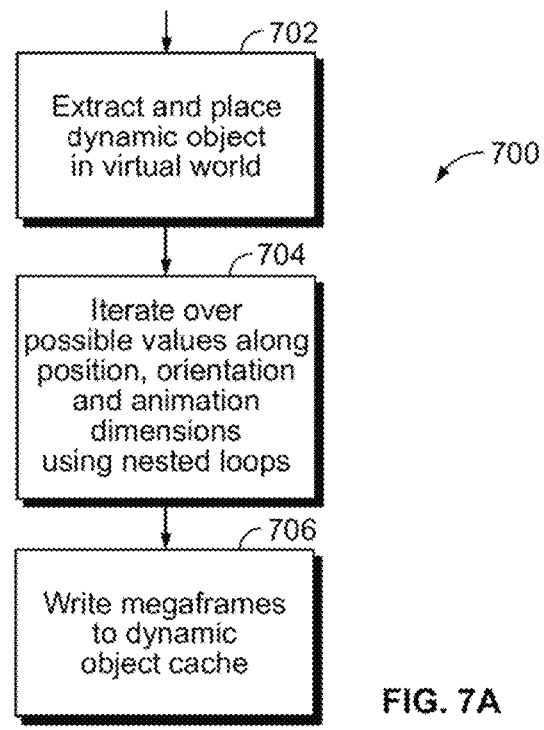
FIG. 7A is a flow diagram illustrating example operations for generating a dynamic object cache.

FIG. 7A is a flow diagram illustrating example operations for generating a dynamic object cache. The process of FIG. 7A may be used, for example, as part of operation 302 of FIG. 3. Offline, cache generator 202 iterates over the input space and renders megaframes. However, instead of only iterating over possible positions, cache generator 202 must take into account that dynamic objects have more dimensions of position, orientation, and animations. This large number of dimensions results in a massive input space for each object. However, the input space may be pruned along all three dimensions.

The process begins at 702 where cache generator 202 extracts and places each dynamic object independently in an otherwise empty virtual world. This provides for megaframe composition free, from side effects. Next, at 204, cache generator 202 iterates over the possible values along the position, orientation and animation dimensions in a set of nested loops. The outer loop is position. This position value comprises the same 3D point format but has a different semantic meaning from a static megaframe's position. The outer loop position is the position of the player relative to that of the object. The outer (first) loop position is calculated by the Euclidean distance between the object position and the device position (user view point of object) in the virtual world. Cache generator 202 prunes the position dimension in the same way as for static frames based on the fact that the dynamic object is only visible to the player from a limited geographical area (e.g., distance). The position value used for dynamic objects is not the physical location of the dynamic object itself in virtual world space, but rather the position of the player relative to the dynamic object. Using this position value reduces the position-dimension state space. For example, when the device position (user view point of object) in the virtual world is from 5 meters north (in a bird's-eye view) of the dynamic object, this configuration results in the same player view of that object no matter the absolute position of the two bodies in the virtual environment. The next inner (second) loop iterates over all possible values along the orientation dimension. Similar to the device position (user view point of object) in the virtual world, a dynamic object can have its own view orientation, commonly referred to as the dynamic object's rotation. Cache generator 202 prunes the orientation dimension according to both device position (user view point of object) viewpoints as well as the possible rotations of the object itself. For example, if the object rotates along the vertical y-axis only, a very common behavior for animated objects, only iterate over angles in the y direction is performed. The final inner (third) loop iterates over all possible animation stages in the object's animation sequence. There may be up to as many stages as there are frames in the animation sequence. Stages may comprise a down-sampling of the number of frames in the animation.

Figure 7B:
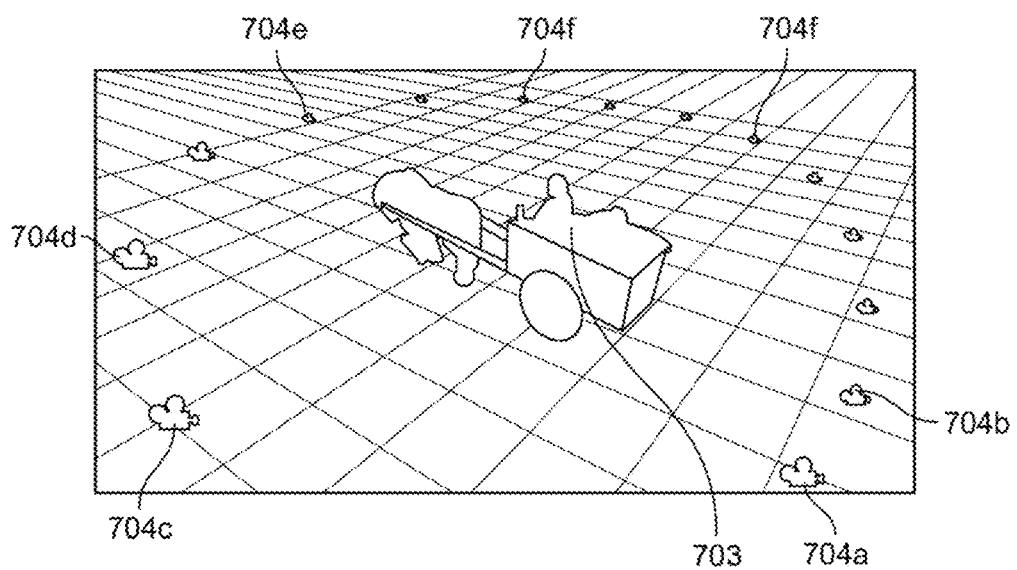
FIG. 7B illustrates an example of image frame generation for a dynamic object in a virtual reality environment.

FIG. 7B illustrates an example of image frame generation for a dynamic object in a virtual reality environment. The cart 703 may be a pre-produced dynamic object with animations. For example, cart 703 may have a detailed "trotting" animation sequence conveying movement. In an example implementation, the cart may be represented as a periodically repeating set of N stages. N may be selected so that there is no loss in animation fidelity when rendering a scene. If cart 703 is associated with multiple animation sequences (e.g., walking, running, or standing), the process of 704 may be repeated for every sequence. In order to know which megaframe should be used for a dynamic object at a given point in time, cache generator 202 may record a pose trace of the dynamic object during offline playback of an original VR application associated with the dynamic object. The pose trace defines the object's motion path and stage in the animation sequence for a given timestamp. Dynamic objects appear deterministically based on the timeline. For example, cart 703 always moves along the same path in the virtual environment, independent of where the user is positioned or looking. In further implementations the cache index may be extended to support different dynamic object behavior based on the player's actions and pose.

Figure 8A:
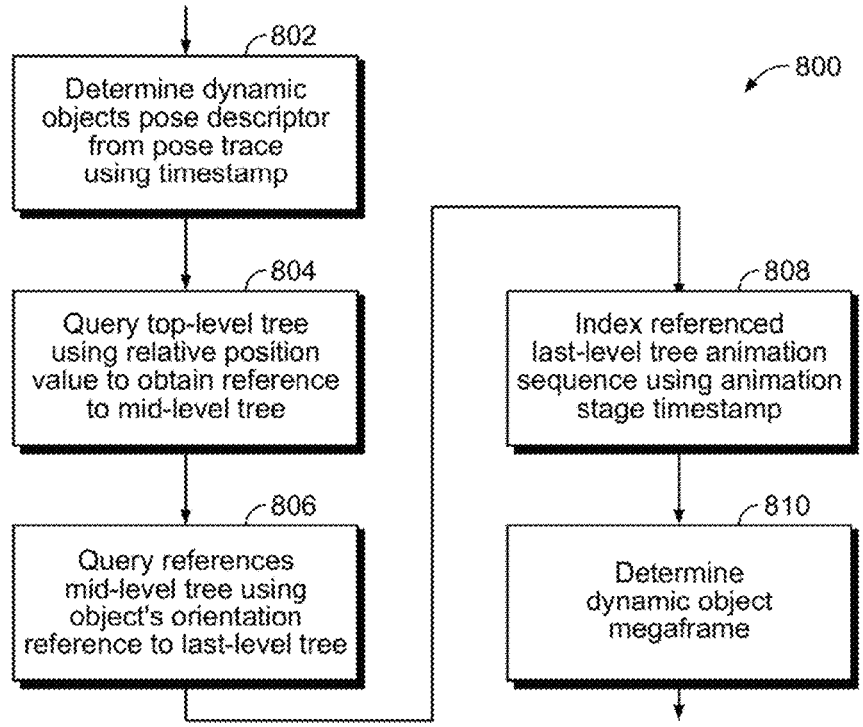
FIG. 8A is a flow diagram illustrating example operations for determining/retrieving a dynamic image frame from a dynamic cache
Figure 8B:
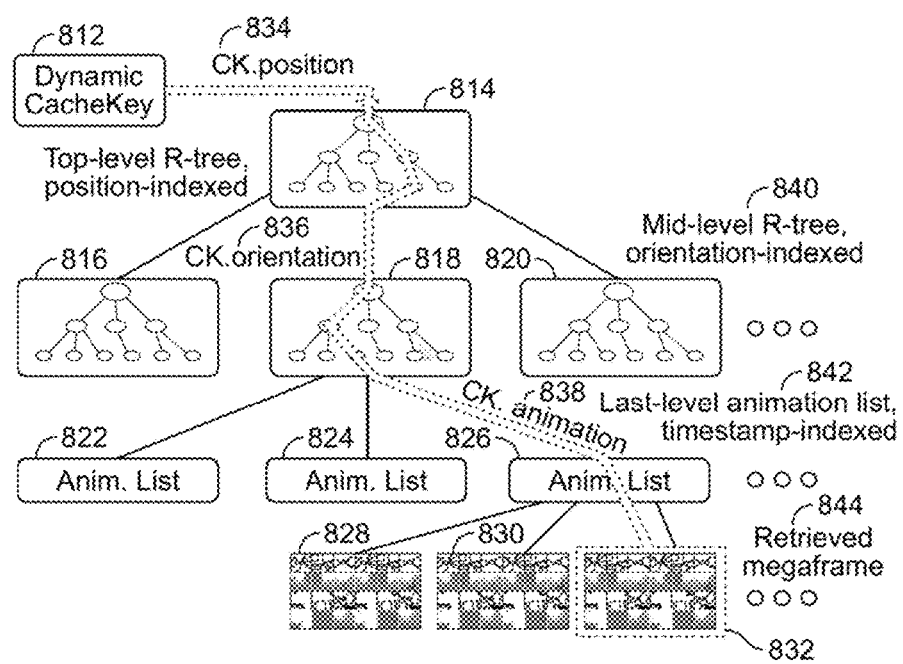
FIG. 8B is a diagram illustrating an example tree structure of a dynamic cache.

FIG. 8A is a flow diagram illustrating example operations for determining/retrieving a dynamic image frame from a dynamic cache. The process of FIG. 8A may be used, for example, as part of operation 306 of FIG. 3. FIG. 8B is a diagram illustrating an example tree structure of a dynamic cache that may be used for the process of FIG. 8A. The dynamic cache key (dynamic CK) 812 of FIG. 8B, including a pose descriptor (orientation and animation) and the relative device position (user view point of object) may be used to query the dynamic cache. The dynamic CK may comprise 7 values including a 3D position vector, 3D orientation vector, and scalar animation stage. In an implementation, instead of constructing a 7 dimension R-tree, a nested R-tree is constructed to provide more efficiency for use with spatial indexing algorithms. The tree structure of FIG. 8B reduces the R-tree for dynamic object megaframes to 3 dimensions at most. The tree structure comprises a top-level R-tree 814 that is indexed by position (CK position) 834 (similar to the universal R-tree for static scenes). However, instead of the leaf nodes pointing to megaframes, each leaf node points to second-level R-trees 840 indexed by orientation (CK orientation) 836. There may be N orientation k-trees, such as 816, 818, and 820, one for each node in the position R-tree. Each leaf node of the orientation R-tree 840 is indexed by animation (CK animation) 838 to point to list level 842 having M animation lists, such as 822, 824 826, that map a timestamp to an animation stage pointer. The animation stage pointer points to one of X megaframes, such as megaframe 828, 830, or 832, that was captured with the corresponding 7-tuple. The nesting ordering of position, orientation and animation prioritizes position distance. Suddenly seeing a large translation jump in a dynamic object will throw off the player's inner balance more so than seeing that object at an unexpected rotation angle or a strange animation frame.

Cache manager 202 may perform the query execution for dynamic object caches by a two-step process. The dotted path in FIG. 8B may be used to describe an example query by the process of FIG. 8A. First, at 802 of FIG. 8A, cache manager 202 determines the dynamic object's pose descriptor from the pose trace. Cache manager 202 queries the pose trace using the current timestamp to determine at what view orientation and animation stage that dynamic object should appear. When the dynamic object pose descriptor has been acquired, cache manager 202 will query the megaframe cache using the dynamic cache key (dynamic CK 812), consisting of the pose descriptor from the trace in operation 802 (CK orientation 836 and CK animation 838) and the relative device position or user view point of object (CK position 834).

At 804, cache manager 202 queries the top-level R-tree 814 using the relative position value (CK position 834) to obtain a reference 818 to the mid-level R-tree 840 indexed by orientation. Next, at 806, cache manager 202 queries the mid-level R-tree 840 at reference 818 using the dynamic object's current orientation (CK orientation 836) to obtain a reference 826 to the lowest level list of animation frame sequences 842 indexed using the animation stage timestamp (CK animation 838). The megaframe 832 that best matches the dynamic CK's values is then retrieved from the animation list 826.

Figure 9:
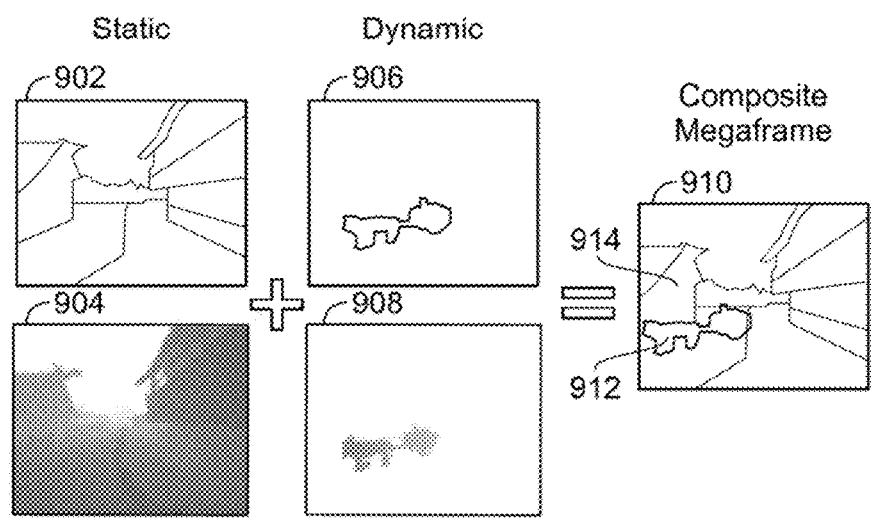
FIG. 9 illustrates an example operation for compositing a static image frame and a dynamic object image frame.

FIG. 9 illustrates an example operation for compositing a static image frame and a dynamic object image frame. The process of FIG. 9 may be used, for example, as part of the process of 308 of FIG. 3. The process of FIG. 9 begins when cache manager 206 has retrieved a static megaframe including RGB image views 902 and depth image views 904, and, a megaframe for every visible dynamic object including RGB image views 906 and depth image views 908. Compositing is performed by cache manager 206 overlaying all of the dynamic object megaframes and the static scene megaframe into a single composite megaframe 910. The depth values (for example rows 404 and 408 of FIG. 4) are used in a pixel shader to determine which objects should occlude other objects and components of the static scene, and vice versa. Cache manager 206 may support complex layering of both dynamic and static objects, e.g., placing a dynamic object in front of one building of a static scene but behind another. Composite megaframe 910 illustrates an example of layering with cart 912 placed in front of building 914. After composition is complete, the composite megaframe is handed off to the cube map warp routine to construct the final view.

In the implementations, when idle decode cycles exist (e.g., when many requests are hitting the GPU cache), predictions may be made to select which megaframes will be requested from the cache in the near future. This may provide an advantage from an energy and performance perspective. The predictions may be used to preemptively decode the selected megaframes and have them ready on GPU cache memory before they are needed. The prediction may by performed by looking n frame periods into the future. For example, if n is 5 frames, the prediction may be performed by reading 5 future values of the dynamic object's pose trace. Cache manager 206 may then lookup those 5 future megaframes and decode as many of the 5 megaframes ahead of time as time permits. Though this is particularly well-suited for dynamic objects due to their predictable motion pattern known ahead of time, Cache manager 206 may also apply the predictions to the static scene by speculating on the player's movement. This requires that the situation be such that cache manager 206 is able to predict the mobile device's future pose information.

Figure 10:
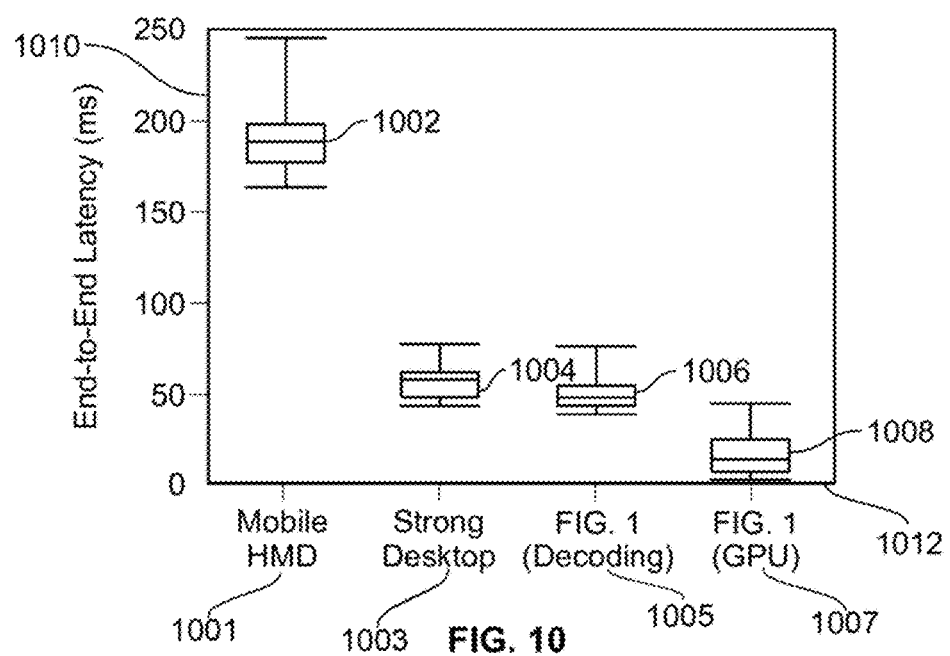
FIG. 10 illustrates example latency improvements provided by an example implementation; and, FIG. 11 illustrates example frame rate improvements provided by an example implementation.

FIG. 10 illustrates example potential latency improvements that may be provided by an example implementation. FIG. 10 demonstrates the end-to-end latency of a prototyped implementation of FIG. 1 as compared to other systems. End to end latency is show on axis 1010 and device type is shown on axis 1012. The end to end latency represents a median elapsed time from when the latest pose information is received from the mobile device until the frame corresponding to that pose is sent to the display. FIG. 10 shows latency 1002 for a conventional mobile HMD (a head mounted device coupled to a high end mobile phone) 1001, latency 1004 for a desktop 1003, latency 1006 for the embodiment of FIG. 1 when decoding of a megaframe is needed 1005, and latency 1008 for the embodiment of FIG. 1 when a megaframe is retrieved directly from GPU cache 1007. As shown in FIG. 8, the implementation of FIG. 1 may achieve a median end-to-end latency 1008 of approximately 12.4 ms for CPU cache hits 1007. The implementation of FIG. 1 may achieve a low latency on a GPU cache hit because the device pose can be sampled right before choosing a texture to display. When the requested megaframe is absent from the GPU cache and must be retrieved and decoded, the implementation of FIG. 1 may still incur lower end-to-end latency 1006 than the latency 1004 incurred by a strong desktop PC 1003.

Figure 11:
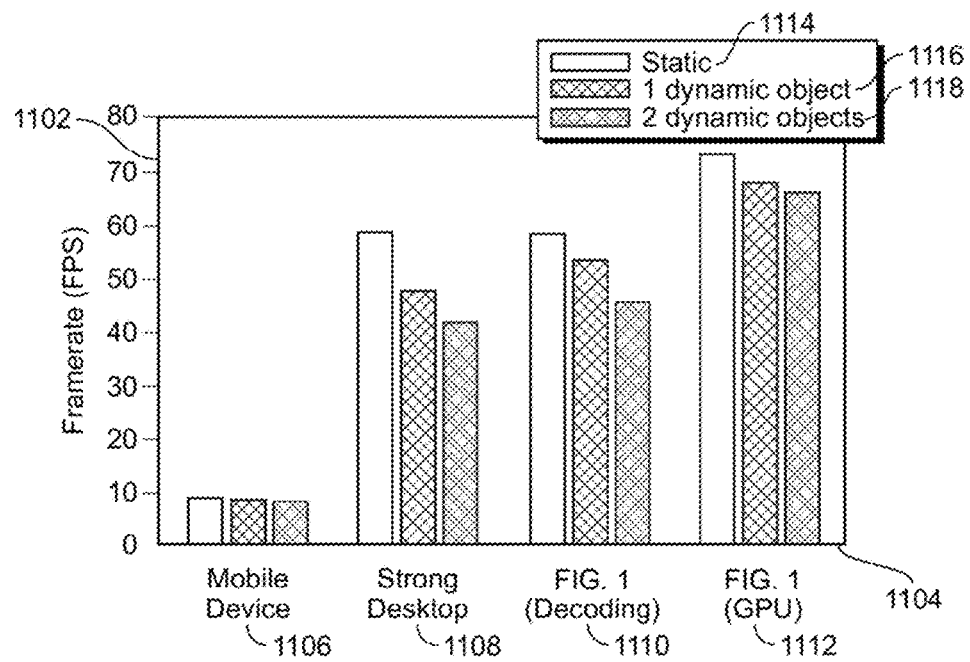

FIG. 11 illustrates example frame rate improvements that may be provided by a prototyped example implementation. FIG. 11 shows a framerate comparison of three different VR configurations running the, same VR application. Frame rate per second is shown on axis 1102. Axis 1104 shows configurations of a conventional HMD with local rendering on a mobile device 1106, local rendering on a strong desktop PC 1108. the implementation of FIG. 1 using cache, when decoding of a retrieved megaframe is needed 1110, and the implementation of FIG. 1 using cache, when a megaframe is retrieved directly from GPU cache 1112. Each device scenario is shown associated with three bar graph scenarios of a static megaframe being retrieved (solid pattern 1114), a static and one dynamic megaframe being retrieved thatched pattern 1116), and a static and two dynamic megaframes being retrieved (hatched pattern 1118). A higher framerate supports a better user experience. FIG. 11 indicates that local rendering on a mobile device 1106 delivers the lowest framerate for the VR application. In contrast, the implementation of FIG. 1, shown by 1110 and 1112, delivers a frame rate approximately 8 times higher than the conventional mobile device 1106 and also exceeds that of the desktop PC 1108.

Figure 12:
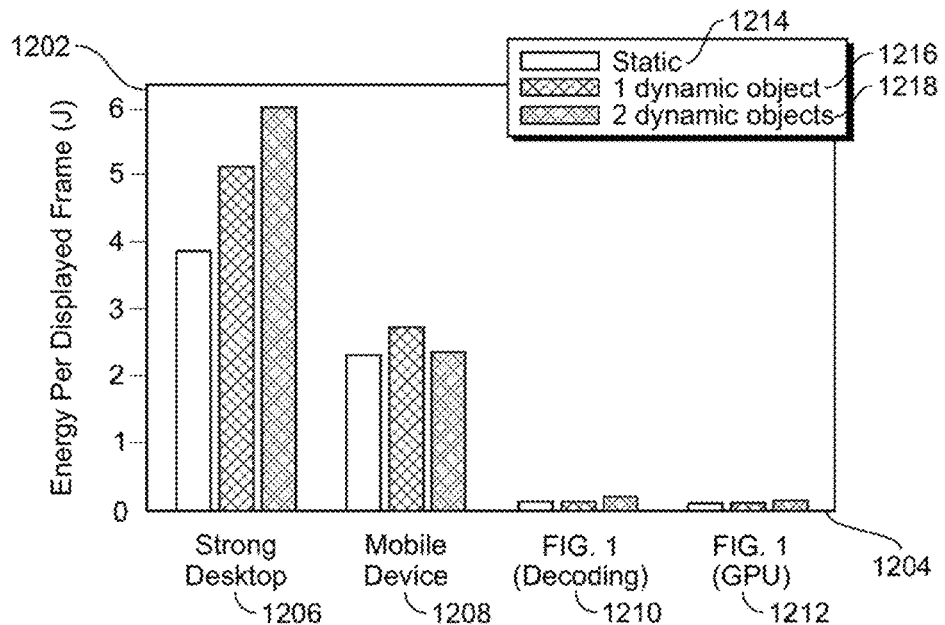
FIG. 12 illustrates example energy per frame use improvements provided by an example implementation.

FIG. 12 illustrates example energy per frame use improvements that may be provided by a prototyped example implementation. FIG. 12 shows an energy per frame comparison of three different VR configurations running the same VR application. Energy per displayed frame in joules is shown on axis 1202. Axis 1204 shows configurations of a conventional HMD with local rendering on a mobile device 1208, local rendering on a strong desktop PC 1206, the implementation of FIG. 1 using cache, when decoding of a retrieved megaframe is needed 1210, and the implementation of FIG. 1 using cache, when a megaframe is retrieved directly from GPU cache 1212. Each device scenario is shown associated with three bar graph scenarios of a static megaframe being retrieved (solid pattern 1114), a static and one dynamic megaframe being retrieved (hatched pattern 1116), and a static and two dynamic megaframes being retrieved (hatched pattern 1118). FIG. 12 shows that the implementation of FIG. 1 may consume less energy, for example under 250 mJ per frame, than local execution on both a conventional mobile device 1208 and desk-top PC 1206. Energy-efficient PR playback enables implementations of the embodiments to run longer on an untethered mobile device such as a providing a more immersive VR experience.

FIGS. 13A, 13B, and 13C illustrate example cache parameters that may be used in various example implementations. FIG. 13A shows, a plot of the median lookup time to query the cache versus the number of flames in the cache. Axis 1302 shows query time and axis 1304 shows number of frames in the cache. In FIG. 13A, therefore, locating (not retrieving) a cached frame in RAM memory is equally as fast as locating one on disk or GPU memory. FIG. 13A shows that additional. GPU R-tree lookup will always have a very low query time, because the on-GPU cache never exceeds a few hundred entries due to its limited size.

FIG. 13B shows the cache retrieval performance from the three different cache sources of a prototype implementation. FIG. 13B shows the retrieval results for 4 k megaframes. Axis 1308 shows the retrieval times and axis 1306 shows the cache sources of GPU memory layer 1, system memory layer 2, for example RAM, and secondary storage layer 3, for example disk. A GPU layer 1 cache hit 1310 is fist, taking less time than a video sync refresh interval. Performance on a GPU memory layer 1 hit is not limited by the cache itself but may be limited by the mobile device's refresh rate. The cost of retrieving from system memory layer 2 and the secondary storage layer 3 is higher because the cache entry must first be decoded, which is a bottleneck in both cases.

FIG. 13C is a table showing the cache storage size necessary to support a virtual environment of varying dimensions and complexities using an example quantization of 0.02 virtual-world units. Column 1316 shows VR environment type and column 1318 shows cache size. The size of the static cache depends not only on the range of possible position values but also on the granularity with which the virtual environment is quantized. At the quantization of 0.02 virtual world units, the requirements for a complex VR environment can fit well within the flash storage of a mobile device. The requirements may be reduced significantly with selective post-deployment decompression in the cache. In addition, while 0.02 is one example of quantization granularity, in other scenarios, the visual inconsistencies introduced by a granularity of up to 0.05 or 0.1 may be too small to distinguish, further reducing storage requirements.

FIG. 14 is a simplified block diagram of an example device 1400. The functions of device 201 of FIG. 2 may be implemented on a device such as device 1400. In an example implementation, device 1400 may be a mobile head mounted display (HMD). In other example implementations, device 1400 may be implemented as any type of mobile device that may be configured to allow a user to interact with a virtual environment.

Device 1400 may include a central processing unit/graphics processing unit (CPU/GPU) 1402, memory 1404, pose tracking function 1406, display 1408, and cache memory 1410. Memory 1404 may be implemented as any type of computer readable storage media, including non-volatile and volatile memory. Memory 1404 is shown as including code comprising device operating system (OS) 1418, cache management programs 1420, and playback control programs 1422. Cache memory 1410 may comprise an N layer cache comprising the 3 layers of layer 1 GPU memory 1412, layer 2 system RAM 1414, and layer 3 secondary storage Flash/SSD 1416. Pose tracking function may comprises one or more sensors on device 1400 that provide device position and orientation information to CPU/GPU 1402. Display 1408 may comprise a display mounted to show VR scenes in view of a user's eyes when device 1400 is worn as a HMD.

CPU/GPU 1402 may comprise one or more processors, or other control circuitry, or any combination of processors and control circuitry. Cache management programs 1420 and playback control programs 1422 provide the functions shown in device 201 of FIG. 2. When executed, cache management programs 1420 and playback control programs 1422 may cause processor CPU/GPU 1402 to control device 1400 to perform processes described in relation to FIGS. 2 and 3, and FIGS. 6 and 8A.

The example embodiments disclosed herein may be described in the general context of processor-executable code or instructions stored on memory that may comprise one or more computer readable storage media (e.g., tangible non-transitory computer-readable storage media such as memory 1400 and cache memory 1410. As should be readily understood, the terms "computer-readable storage media" or "non-transitory computer-readable media" include the media for storing of data, code and program instructions, such as memory 1400 and cache memory 1410, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

The disclosed implementations include a device comprising a display, one or more processors coupled to the display, and, memory in communication with the one or more processors. The memory may include a cache comprising a plurality of image frames of a virtual environment, and the code, when executed, may cause the one or more processors to control the device to determine a pose associated with the device in the virtual environment, determine at least one image frame from the plurality of image frames based on the pose, and, display an image of the virtual environment on the display, the image generated from the at least one image frame. The cache may comprise a first layer including a first set of frames of the plurality image frames and at least a second layer including a second set of frames of the plurality of frames that are compressed. The at least one image frame comprises a megaframe including; a plurality of cube maps having panoramic images, each of the plurality of cube maps associated with the pose. The plurality of cube maps comprise a left eye color cube map, a left eye depth cube map, a right eye color cube map, and right eye depth cube map. The cache may comprise a static cache and a dynamic object cache, and the at least one image frame determined from the plurality of pre-rendered image frames may include a static image frame and a dynamic object image frame representing a dynamic object, and the code may further cause the one or more processors to display the image on the display by controlling the device to overlay the static image frame and the dynamic object image frame into a composite frame, and, display the image of the virtual environment on the display, the image generated from the composite frame. The static image frame may be retrieved from the static cache based on the pose, and the dynamic image frame may be retrieved from the dynamic cache based on a pose descriptor associated the dynamic object and a position of the device relative to the dynamic object in the virtual environment that is derived from the pose. The code further may cause the one or more processors to overlay the static image frame and the dynamic object image frame by using pixel depth data embedded in the static image frame and the dynamic object image frame. The at least one image frame may comprise a first at least one image frame and the cache may include a first layer cache comprising a first plurality of image frames and at least one second layer cache comprising a second plurality of image frames that are compressed, and the code may further cause the one or more processors to retrieve the first at least one image frame by controlling the device to determine the first at least one image frame from the first layer cache based on the pose, determine a second at least one image frame from both of the first layer cache and the at least one second layer cache based on the pose, decompress the second at least one image frame, determine if the first and the second at least one image frame match, and, if the first and the second at least one image frame do not match, insert the second at least one image in place of the first at least one image in the first layer cache. The at least one image frame may comprise at least one dynamic object frame and the cache may include a dynamic object cache comprising a plurality of dynamic object frames, and the code may further cause the one or more processors to determine the first at least one dynamic object frame by controlling the device to determine a pose descriptor for a dynamic object based on an object pose trace using a time stamp, retrieve the at least one dynamic object image frame from the plurality of pre-rendered dynamic object frames based on the pose descriptor and a position of the dynamic object relative to the device, wherein the position is based on the pose associated with the device in the virtual environment. The device may comprise at least one sensor coupled to the one or more processors, and the code causes the one or more processors to determine the pose by controlling the device to receive data comprising data on the 3D position and 3D orientation of the device from the at least one sensor, and, determine the pose of the device in the virtual environment from the data.

The disclosed implementations also include a method comprising determining a pose associated with a device in a virtual environment, determining at least one image frame from a plurality of image frames stored in a cache memory on the device based on the pose, and, displaying an image of the virtual environment on a display of the device, the image generated from the at least one image frame. The at least one image frame may comprises a megaframe and the method may further comprise capturing a stereo color image at a selected grid point in the virtual environment, writing the captured stereo color image to a cube map, capturing a stereo depth image at the selected grid point, compositing the captured stereo color image and stereo depth image into the megaframe, and, storing the megaframe as one of the plurality of image frames in the cache memory. The cache memory may comprise a first layer cache comprising a first plurality of image frames and at least one second layer cache comprising a second plurality of image frames, and the determining the at least one image may further comprise determining the first at least one image frame from the first plurality of image frames by searching a first index of entries based on the pose, the first index including entries in the first layer cache, determining a second at least one image frame from the second plurality of image frames by searching a second index of entries based on the pose, the second index including entries in the first layer cache and the at least one second layer cache, decompressing the second at least one frame, determining if the first and the second at least one image frame match, and, if the first and the second at least one image frame do not match, inserting the second at least one image in place of the first at least one image in the first layer cache. The cache memory may comprise a dynamic object cache, the at least one image frame may comprises at least one dynamic object image frame, and the method may further comprise determining a pose descriptor for a dynamic object based on an object pose trace using a time stamp, retrieving the at least one dynamic object image frame from the dynamic object cache based on the pose descriptor and a position of the dynamic object relative to the device, wherein the position is based on the pose associated with the device in the virtual environment. The plurality of image frames may comprise a plurality of dynamic object image frames and the method may further comprises placing a dynamic object in the virtual environment, iterating over a set of values of positions relative to the dynamic object in the virtual environment, values of orientation, and values of animation of the dynamic object in the virtual environment using nested loops to generate the plurality of dynamic object image frames, storing the plurality of dynamic object image frames in the cache memory on the device.

The disclosed implementations further include an apparatus comprising at least one processor, at least one sensor coupled to the at least one processor, a display coupled to the at least one processor, a first memory portion communicating with the at least one processor, the first memory portion comprising a first cache including a plurality of first image frames, and, a second memory portion communicating, with the at least one processor, the second memory portion comprising code that when executed causes the at least one processor to receive position and orientation data from the at least one sensor, determine a pose in a virtual environment based on the position and orientation data; determine at least one image frame from the first plurality of image frames stored in the first cache based on the pose, and, display an image of the virtual environment on the display, the image generated from the at least one image frame. The first memory portion may further comprise at least a second cache including a plurality of second image frames, the second plurality of image frames being in a compressed format as compared to the first plurality of image frames, the at least one image frame may comprise a first at least one image frame, the image comprises a first image, and the code may further control the processor to determine a second at least one image frame from the second plurality of image frames stored in the second at least one cache based on the pose, decompress the second at least one image frame, store the second at least one image frame in the first cache in place of the first at least one image frame, and, display a second image of the virtual environment on the display, the second image generated from the decompressed, second, at least one image frame. The first cache, may comprise a static cache and a dynamic object cache, and the at least one image frame determined from the first plurality of image frames may include a static image frame and a dynamic object image frame representing a dynamic object, and the code may further controls the at least one processor to overlay the static image frame and the dynamic object image frame into a composite frame, and, display the image of the virtual environment on the display by displaying the image generated from the composite frame. The at least one image frame may comprise a plurality of cube maps having panoramic images, each of the plurality of cube maps associated with the pose. The apparatus may comprise a wearable device.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types, of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device comprising:
a display;
one or more processors coupled to the display; and,
memory in communication with the one or more processors, the memory including a cache comprising a plurality of image frames of a virtual environment, and code that, when executed, causes the one or more processors to control the device to:
determine a pose associated with the device in the virtual environment;
determine at least one image frame from the plurality of image frames based on the pose; and,
display an image of the virtual environment on the display, the image generated from the at least one image frame,
wherein the cache comprises a static cache and a dynamic object cache, and the at least one image frame determined from the plurality of image frames includes a static image frame and a dynamic object image frame representing a dynamic object, and the code further causes the one or more processors to display the image on the display by controlling the device to:
overlay the static image frame and the dynamic object image frame into a composite frame; and
display the image of the virtual environment on the display, the image generated from the composite frame.

2. The device of claim 1, wherein the cache comprises a first layer including a first set of frames of the plurality image frames and at least a second layer including a second set of frames of the plurality of frames that are compressed.

3. The device of claim 2, wherein the at least one image frame comprises a megaframe including a plurality of cube maps having panoramic images, each of the plurality of cube maps associated with the pose.

4. The device of claim 3, wherein the plurality of cube maps comprise a left eye color cube map, a left eye depth cube map, a right eye color cube map, and right eye depth cube map.

5. The device of claim 1, wherein the static image frame is retrieved from the static cache based on the pose, and the dynamic image frame is retrieved from the dynamic cache based on a pose descriptor associated the dynamic object and a position of the device relative to the dynamic object in the virtual environment that is derived from the pose.

6. The device of claim 1, wherein the code further causes the one or more processors to overlay the static image frame and the dynamic object image frame by using pixel depth data embedded in the static image frame and the dynamic object image frame.

7. The device of claim 1, wherein the at least one image frame comprises a first at least one image frame and the cache includes a first layer cache comprising a first plurality of image frames and at least one second layer cache comprising a second plurality of image frames that are compressed, and the code further causes the one or more processors to retrieve the first at least one image frame by controlling the device to:
determine the first at least one image frame from the first layer cache based on the pose;
determine a second at least one image frame from both of the first layer cache and the at least one second layer cache based on the pose;
decompress the second at least one image frame;
determine if the first and the second at least one image frame match;
and, if the first and the second at least one image frame do not match:
insert the second at least one image in place of the first at least one image in the first layer cache.

8. The device of claim 1, wherein the code further causes the one or more processors to determine the first at least one dynamic object frame by controlling the device to:
determine a pose descriptor for the dynamic object based on an object pose trace using a time stamp; and
retrieve the at least one dynamic object image frame from the plurality of dynamic object frames based on the pose descriptor and a position of the dynamic object relative to the device, wherein the position is based on the pose associated with the device in the virtual environment.

9. The device of claim 1, wherein device comprises at least one sensor coupled to the one or more processors, and the code causes the one or more processors to determine the pose by controlling the device to:
receive data comprising data on the 3D position and 3D orientation of the device from the at least one sensor; and,
determine the pose of the device in the virtual environment from the data.

10. A method comprising:
determining a pose associated with a device in a virtual environment;
determining at least one image frame from a plurality of image frames stored in a cache memory on the device based on the pose; and,
displaying an image of the virtual environment on a display of the device, the image generated from the at least one image frame,
wherein the cache memory comprises a static cache and a dynamic object cache, and the at least one image frame determined from the plurality of image frames includes a static image frame and a dynamic object image frame representing a dynamic object,
wherein displaying an image of the virtual environment on the display of the device includes:
overlaying the static image frame and the dynamic object image frame into a composite frame; and
displaying the image of the virtual environment on the display, the image generated from the composite frame.

11. The method of claim 10, wherein the at least one image frame comprises at least one megaframe and the method further comprises:
   capturing a color image at a selected grid point in the virtual environment;
   capturing a depth image at the selected grid point;
   converting the captured color image and depth image into the at least one megaframe; and,
   storing the at least one megaframe as one of the plurality of image frames in the cache memory.

12. The method of claim 10, wherein the cache memory comprises a first layer cache comprising a first plurality of image frames and at least one second layer cache comprising a second plurality of image frames, and the determining the at least one image further comprises:
   determining the first at least one image frame from the first plurality of image frames by searching a first index of entries based on the pose, the first index including entries in the first layer cache;
   determining a second at least one image frame from the second plurality of image frames by searching a second index of entries based on the pose, the second index including entries in the first layer cache and the at least one second layer cache;
   decompressing the second at least one frame;
   determining if the first and the second at least one image frame match;
      and, if the first and the second at least one image frame do not match:
         inserting the second at least one image in place of the first at least one image in the first layer cache.

13. The method of claim 10, wherein the method further comprises:
   determining a pose descriptor for the dynamic object based on an object pose trace using a time stamp; and
   retrieving the at least one dynamic object image frame from the dynamic object cache based on the pose descriptor and a position of the dynamic object relative to the device, wherein the position is based on the pose associated with the device in the virtual environment.

14. The method of claim 10, wherein the method further comprises:
   placing the dynamic object in the virtual environment;
   iterating over a set of values of positions relative to the dynamic object in the virtual environment, values of orientation, and values of animation of the dynamic object in the virtual environment using nested loops to generate the plurality of dynamic object image frames; and
storing the plurality of dynamic object image frames in the cache memory on the device.

15. An apparatus comprising:
   at least one processor;
   at least one sensor coupled to the at least one processor;
   a display coupled to the at least one processor;
   a first memory portion communicating with the at least one processor, the first memory portion comprising a first cache including a plurality of first image frames; and,
   a second memory portion communicating with the at least one processor, the second memory portion comprising code that when executed causes the at least one processor to:
      receive position and orientation data from the at least one sensor;
      determine a pose in a virtual environment based on the position and orientation data;
      determine at least one image frame from the first plurality of image frames stored in the first cache based on the pose; and,
      display an image of the virtual environment on the display, the image generated from the at least one image frame,
   wherein the first cache comprises a static cache and a dynamic object cache, and the at least one image frame determined from the first plurality of image frames includes a static image frame and a dynamic object image frame representing a dynamic object, and the code further controls the at least one processor to display the image on the display by controlling the at least one processor to:
   overlay the static image frame and the dynamic object image frame into a composite frame; and,
   display the image of the virtual environment on the display by displaying the image generated from the composite frame.

16. The apparatus of claim 15, wherein the first memory portion further comprises at least a second cache including a plurality of second image frames, the second plurality of image frames being in a compressed format as compared to the first plurality of image frames, the at least one image frame comprises a first at least one image frame, the image comprises a first image, and the code further controls the processor to:
   determine a second at least one image frame from the second plurality of image frames stored in the second at least one cache based on the pose;
   decompress the second at least one image frame;
   store the second at least one image frame in the first cache in place of the first at least one image frame; and,
   display a second image of the virtual environment on the display, the second image generated from the decompressed second at least one image frame.

17. The apparatus of claim 15, wherein the at least one image frame comprises a plurality of cube maps having panoramic images, each of the plurality of cube maps associated with the pose.

18. The apparatus 16, wherein the apparatus comprises a wearable device.

* * * * *